(12) United States Patent
Muhlhoff

(10) Patent No.: US 10,239,362 B2
(45) Date of Patent: Mar. 26, 2019

(54) TIRE COMPRISING A DEFECT-MASKING PATTERN ON A SIDEWALL

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventor: Olivier Muhlhoff, Clermont-Ferrand (FR)

(73) Assignees: Compagnie Generale Des Etablissements Michelin, Clermont-Ferrand (FR); Michelin Recherche Et Technique, S.A., Granges-Paccot (CH)

(*) Notice: Subject to any disclaimer, the term of this patent is extended or adjusted under 35 U.S.C. 154(b) by 170 days.

(21) Appl. No.: 15/037,401

(22) PCT Filed: Nov. 26, 2014

(86) PCT No.: PCT/EP2014/075597
§ 371 (c)(1),
(2) Date: May 18, 2016

(87) PCT Pub. No.: WO2015/078881
PCT Pub. Date: Jun. 4, 2015

(65) Prior Publication Data
US 2016/0288584 A1    Oct. 6, 2016

(30) Foreign Application Priority Data
Nov. 29, 2013  (FR) ..................... 13 61862

(51) Int. Cl.
B60C 13/02    (2006.01)
B60C 13/00    (2006.01)

(52) U.S. Cl.
CPC .............. B60C 13/02 (2013.01); B60C 13/00 (2013.01); B60C 13/001 (2013.01)

(58) Field of Classification Search
CPC ....... B60C 13/00; B60C 13/001; B60C 13/02; B60C 13/023; G09F 21/04;
(Continued)

(56) References Cited

U.S. PATENT DOCUMENTS 6,439,287 B1    8/2002  Baumhofer
2014/0378030 A1*  12/2014  Ikemura ............... B29C 33/424
451/38

FOREIGN PATENT DOCUMENTS

DE    102008037483 A1 *  4/2010  ........... B60C 13/001
FR    2412426 A1    7/1979
(Continued)

OTHER PUBLICATIONS

Eisuke Hirosue, JP 2014-136487, machine translation. (Year: 2014).*
(Continued)

*Primary Examiner* — Robert C Dye
*Assistant Examiner* — Sedef E Paquette
(74) *Attorney, Agent, or Firm* — Dickinson Wright PLLC

(57) ABSTRACT

A tire made of rubbery material having a sidewall includes a pattern formed on this sidewall. The pattern has a plurality of protruding elements, with the protruding elements having the form of spherical-cap portions having a radius, and, within the pattern, each protruding element interpenetrates with several adjacent protruding elements so that the distance between a tip of the protruding element and a tip of another adjacent protruding element is less than the diameter of the protruding element.

6 Claims, 3 Drawing Sheets

(58) Field of Classification Search
CPC ...... B29D 2030/0612; B29D 2030/726; B29D 2030/728; B29D 30/72
USPC ...................................... 152/523, 151, 450
See application file for complete search history.

(56) References Cited

FOREIGN PATENT DOCUMENTS

| | | | |
|---|---|---|---|
| JP | 11321242 A | * | 11/1999 |
| JP | H11321243 A | | 11/1999 |
| JP | 2014136487 A | * | 7/2014 |
| WO | 2012/066717 A1 | | 5/2012 |

OTHER PUBLICATIONS

Markus Metz, DE 102008037483, machine translation. (Year: 2010).*
Shinobu Itabashi, JP 11-321242, machine translation. (Year: 1999).*

* cited by examiner

TIRE COMPRISING A DEFECT-MASKING PATTERN ON A SIDEWALL

This application is a 371 national phase entry of PCT/EP2014/075597 filed 26 Nov. 2014, which claims the benefit of French Patent Application No. 1361862, filed 29 Nov. 2013, the contents of which are incorporated herein by reference for all purposes.

BACKGROUND

A tire in the known way comprises an internal carcass, a tread, a bead for attachment to a rim, a sidewall, and an inner liner. The internal carcass is made up of at least one carcass ply of rubber-coated threads. During a stage in the manufacture of the tire, this carcass ply is cut and assembled onto a building drum. Because this ply may make a number of turns around this drum, there are thus a plurality of layers formed from one and the same carcass ply. Now, it sometimes happens that, during the placement of the ply, the end of this ply does not coincide exactly with the start of this ply on the drum, meaning that there is a surplus of ply in the assembly. This superposition locally creates an additional thickness on the green tire. Once this green tire has been vulcanized and the resulting tire has been inflated, this additional thickness gives the appearance of a crater in the sidewall of the tire. Now, this crater is particularly visible on the tire, notably under certain lighting conditions, and may form a reason for a consumer not to purchase the tire even through this defect is not detrimental to safety. In order to mask this defect on the sidewall of the tire, according to the prior art described in U.S. Pat. No. 6,439,287, it is proposed that a moiré pattern be formed over the entire sidewall of the tire, and notably in the region where the distortion/cratering deformation created by the overlapping of the ends of the carcass ply or plies occurs. A number of moiré patterns are described. These moiré patterns constitute interference patterns notably comprising striations. Thus, these moiré patterns create interferences when light is reflected off the sidewall of the tire. The differences in light reflection that there are between the distorted/cratered region and the rest of the surface of the sidewall are thus no longer visible to the naked eye.

One problem with this prior art is that the method of manufacturing these moiré patterns is complex and costly to implement. Another problem is that the pattern does not provide the consumer with an appearance he regards as satisfactory.

That being the case, the aspects disclosed herein seek to mask this sidewall deformation defect in a way that is simpler, and to do so for the vast majority of angles from which a consumer might observe the tire.

A "tire" means any type of resilient tire whether or not subjected to an internal pressure.

The "tread" of a tire means a quantity of rubbery material delimited by lateral surfaces and by two main surfaces, one of them an inner surface and the other an outer surface, the said outer surface being intended to come into contact with a roadway when the tire is being driven on.

The "bead" of a tire means a part of the tire that is intended to be seated on a wheel rim.

The "sidewall" of a tire means a lateral surface of the tire positioned between the tire tread and a bead of this tire.

A "protruding element interpenetrating with other adjacent protruding elements" means that the spherical cap formed by the protruding element is interrupted by the other adjacent protruding elements so that the distance between the tip of the spherical cap and the tip of another adjacent protruding element is less than the diameter of this spherical cap.

A "pattern formed on a sidewall" means a sidewall part having homogeneous surface finish features that differ from the rest of the sidewalk. This pattern may deliver technical and legal information and, on the other hand, may allow consumers to discern the origin of the product.

SUMMARY

To this end, the invention proposes a tire made of rubbery material comprising a sidewall and a pattern formed on this sidewall. The pattern comprises a plurality of protruding elements, the said protruding dements having the form of spherical-cap portions. Within the pattern, each protruding element interpenetrates with several adjacent protruding elements so that the distance between a tip of the protruding element and a tip of another adjacent protruding element is less than the diameter of the protruding element.

Thus as will be seen later, the interpenetration of the spherical caps with one another makes it possible to avoid too great an absorption of light by the texture of the sidewall of the tire. Rays of light originating from one and the same light source and illuminating the sidewall of the tire are thus substantially deflected in the same way on the pattern, both in the region of the pattern covering the deformed part of the sidewall and in the region of the pattern covering the sidewall where there is no deformation.

According to some nonlimiting examples, the tire may furthermore comprise one or more additional features from among the following:

The density of protruding elements within the pattern is greater than or equal to 0.2 protruding elements per $mm^2$. That makes it possible to give the pattern a more uniform appearance to an observer.

Viewed in cross section, all or part of the protruding elements subtend an angle less than or equal to 70°. That makes it possible to obtain a better surface for reflection of the light. The pattern thus appears more clearly on the sidewall of the tire.

The protruding elements are aligned with one another within the pattern. The limits of the pattern are thus better controlled.

All or part of the protruding elements have a surface roughness parameter Ra less than 30 µm. That makes it possible to obtain a surface close to a polished surface and thus to limit the scattering of the light.

The tire comprises a housing recessed into the sidewall, the pattern being arranged in the housing.

The protruding elements meet at connection zones, these connection zones being curved. These zones have a blend radius r such that $r \leq R/3$.

BRIEF DESCRIPTION OF THE DRAWINGS

Further features and advantages will become apparent from the following description, given by way of non-limiting example, with reference to the attached drawings in which.

DETAILED DESCRIPTION

Figure 1:
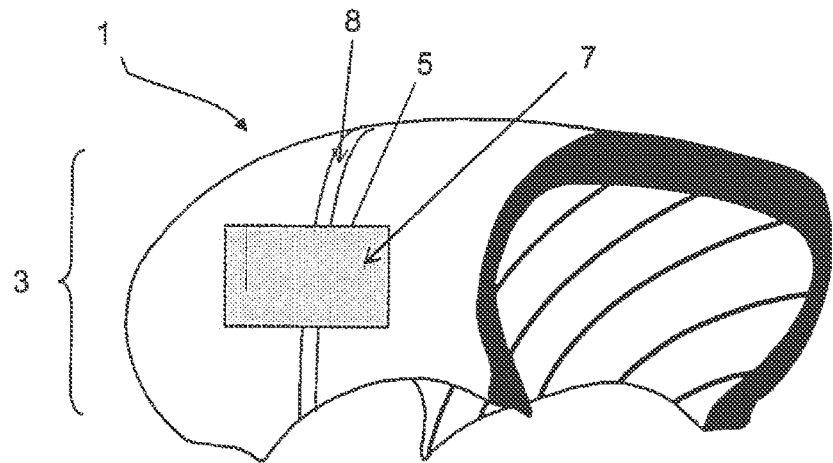
FIG. 1 is a schematic view of a tire sidewall, the said sidewall comprising a pattern that contrasts with this sidewall.

In the description which will follow, elements that are substantially identical or similar will be denoted by identical references. FIG. 1 illustrates the sidewall 3 of the tire 1, the said sidewall 3 comprising a pattern 5. FIG. 1 depicts a sample of the pattern 5 that covers the sidewall deformation 8. The pattern 5 comprises a plurality of protruding elements 7 projecting with respect to the surface of the sidewall. The pattern 5 extends over all or part of the surface of the sidewall and, in particular, over the part comprising the sidewall deformation 8 created by the overlapping of carcass ply of the tire 1. The pattern 5 thus covers the entire distortion/cratering 8. When the pattern 5 extends over the entire circumferential surface of the sidewall 3, somebody looking at the tire will see very little visual difference between the pattern 5 and the sidewall 3.

Figure 2:
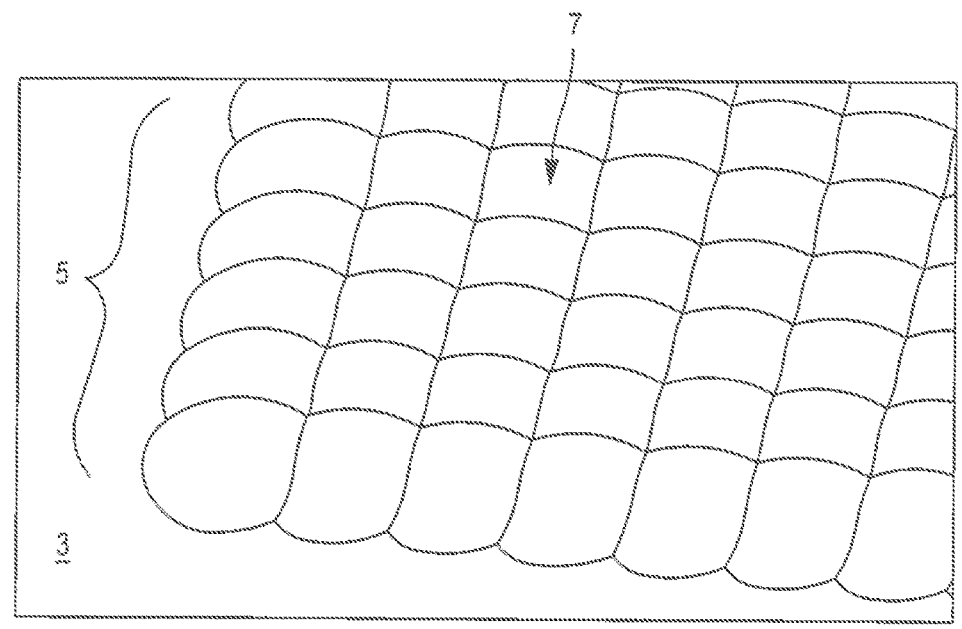
FIG. 2 is a perspective view of a plurality of protruding elements that make up the pattern of FIG. 1.

FIG. 2 is an enlarged perspective view of part of the pattern 5 of FIG. 1. As can be seen in the Figure, the protruding elements 7 have the same shape and the pattern 5 comprises a repeat of this same shape. The shape is a closed surface. The shape is a spherical cap of radius R, also referred to as shells or micro bumps.

A spherical cap means a cap the radius R of which is constant. As an alternative, the radius R of the caps may vary by plus or minus 10%.

Figure 3:
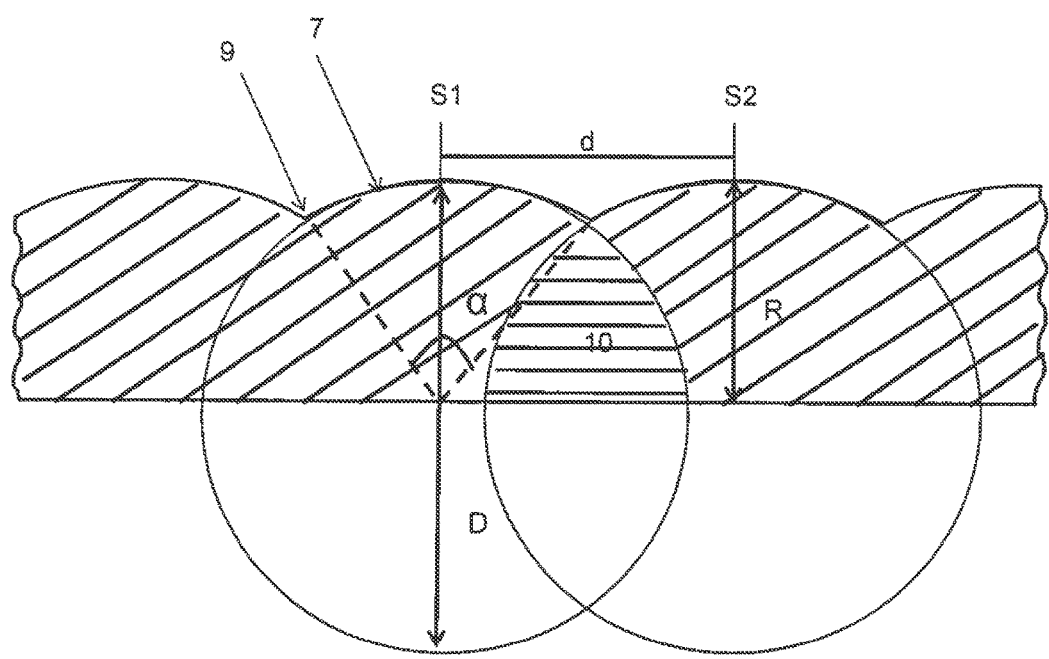
FIG. 3 is a schematic view in cross section of part of the protruding elements of FIG. 1.

When viewed in cross section, FIG. 3, the geometric shape of the protruding elements 7 is thus convex. Each protruding element 7 has the particular property of reflecting a quantity of light that remains constant even if the pattern is inclined by a small angle with respect to a starting position corresponding in this example to the position on the sidewall undeformed. In a nonlimiting example, the inclination of the angle is less than 5°, corresponding to the inclination of the cavity created by the sidewall deformation with respect to the surface of the undeformed sidewall.

In one nonlimiting embodiment illustrated in FIG. 2, the protruding elements 7 are aligned with respect to one another within the pattern 5 and protrude with respect to the sidewall 3. This allows good delimitation of the pattern 5.

Within the pattern 5, each spherical cap 7 interpenetrates with several adjacent protruding elements. Thus, as illustrated in FIG. 3, the distance d (also referred to as "spacing") between the tip S1 of one spherical cap and the tip S2 of another adjacent spherical cap is less than the diameter D of this spherical cap. In one nonlimiting embodiment, the spacing d between two tips S1-S2 is greater than or equal to 0.3 mm and less than 2 mm. Thus, to the naked eye, from a distance of more than 2 meters away, all that will be seen is a patterned texture of uniform colour. In one nonlimiting exemplary embodiment, the spacing d between two tips S1-S2 is equal to 1 mm. That makes producing the caps on an industrial scale easier and allows the use of inexpensive tooling.

As can be seen in FIG. 3, because these spherical caps interpenetrate one another, they have a common zone 10 (illustrated by horizontal hatching).

FIG. 3 also shows that by virtue of this interpenetrating spherical-cap design, these caps have limited inter-cap spaces 9, which means to say that the spaces are of small surface area.

In order optimally to reduce these inter-cap spaces 9, in one nonlimiting embodiment, viewed in section (cross section of FIG. 3), each protruding element 7 subtends an angle $\alpha$ less than or equal to 70°. If the angle subtended were greater, the surface area of the inter-cap spaces 9 would be greater and would carry a significant risk of light absorption. The "angle $\alpha$ subtended" means the angle formed by the spherical-cap portion which forms the protruding element 7. More particularly, the "angle $\alpha$ subtended" means, when viewed in cross section, the angle formed by two segments passing through the inter-cap spaces 9 and meeting at the centre of the protruding element 7.

By reducing the surface area of the inter-cap space 9, incident rays of light impinging on the pattern 5 and therefore on the spherical caps 7 are reflected back towards the observer. With this pattern 5, very little light is absorbed by the texture of the sidewall of the tire. There is therefore no zone referred to as "black". The light is reflected in the same way (same angle of reflection) on the pattern 5 covering the distortion/cratering defect 8 as it is on the pattern covering that part of the sidewall 3 that has no defect. Thus, the visual effect created by the distortion/cratering 8 is practically no longer visible, if visible at all, whatever the position of the observer with respect to the sidewall of the tire. The entire pattern 5 makes it possible to create what is referred to as a "white" region because of the optimized reflection off light of this pattern 5.

In order to increase the reflection of light, the caps have a texture which is close to a smooth reflective surface which does not scatter the light or reduce the reflective light intensity. Thus, the arithmetic standard deviation parameter Ra indicative of the surface roughness is very low and less than 30 µm. The quantity of light reflected is maximized. Whatever the position of the observer and therefore of the eye with respect to the tire 1 and whatever the light source illuminating the sidewall 3 of the tire, the pattern 5 makes it possible to mask the visual effected created by the defect caused by the overlapping of carcass ply, namely the sidewall deformation.

In order to obtain a method of manufacture that is easy to implement, in one nonlimiting embodiment, the density of protruding elements 7 within the pattern 5 is greater than or equal to 0.2 elements per $mm^2$. Thus, one simple example of a method of manufacturing a mould that corresponds to the negative of the pattern 5 is to machine the mould using a spherical milling cutter.

Figure 4:
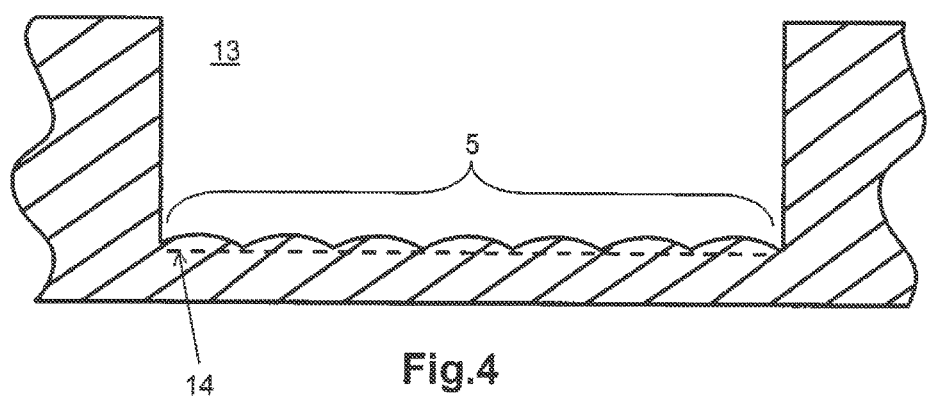
FIG. 4 is a schematic view of an alternative form of embodiment of the pattern of FIG. 1.

FIG. 4 depicts an alternative form of embodiment in which the tire comprises a housing 13 recessed into the sidewall 3. The pattern 5 is thus arranged in this housing 13 in such a way that the protection of this pattern against wear caused, for example, by kerbing is improved. The projecting elements 7 project with respect to the bottom 14 of the housing 13.

Figure 5:
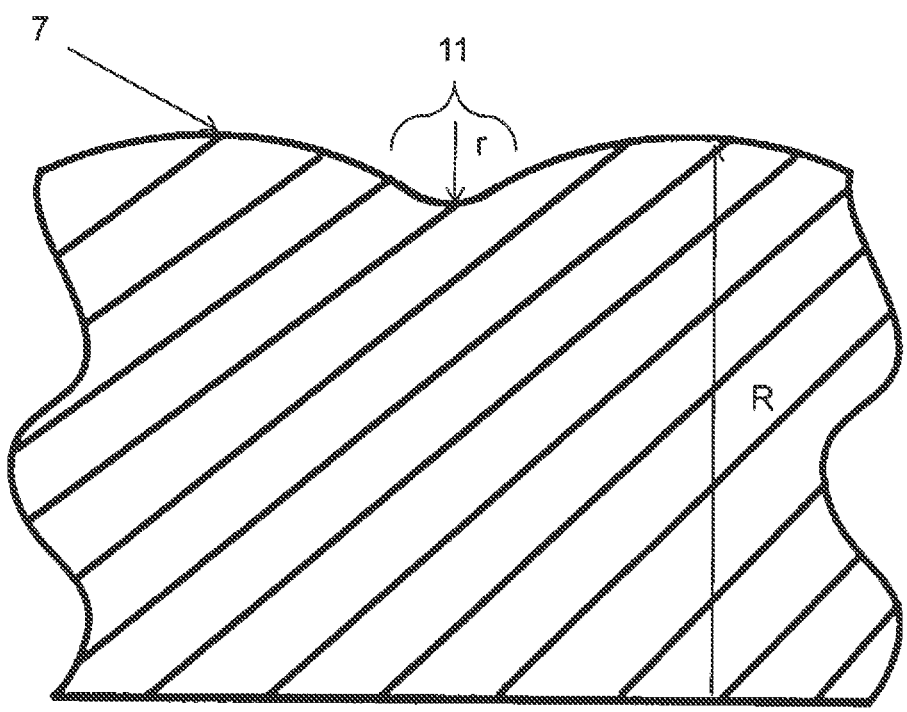
FIG. 5 is a schematic view of an alternative form of embodiment of the pattern of FIG. 1.

FIG. 5 depicts another alternative form of embodiment in which the protruding elements 7 meet at the connection zones 11. These connection zones 11 are curved and have blend radius r. This blend radius r is less than or equal to one third of the radius R of the spherical caps. This then limits the risk of cracks spreading through the pattern, at the connection zones.

The aspects disclosed herein is not restricted to the examples described and depicted and various modifications can be made thereto without departing from the scope thereof. Thus, in one nonlimiting embodiment, the protruding elements are made by machining a mould using a milling cutter, the said mould corresponding to the negative of the pattern. This makes it possible to create protruding elements which are aligned within the pattern in at least one preferred direction, and to do so in a simple and economical way.

In another nonlimiting embodiment, the pattern 5 comprises protruding elements 7 which are not aligned.

In one nonlimiting embodiment, the protruding elements 7 are produced during a surface treatment of the mould by micropeening. Using this inexpensive method, a pattern can be created that comprises non-aligned protruding elements.

In another nonlimiting example, the negative of the pattern 5 is produced by laser machining.

Thus, the aspects described notably offers the following advantages:

- with the proposed texture of the pattern, the quantity of light reflected varies very little, even with a local variation in the angle of the surface of the tire caused by the cavity of the deformation. Thus, the uniformity of the quantity of light originating from a light source and reflected towards an observer by an element made of rubber is improved. Further, the observer thus perceives a surface of uniform colour despite the local variation in the angle of the surface of the sidewall.
- with the spheres interpenetrating one another it is possible to avoid having a crater between the spherical caps which would absorb light and create a black zone;
- whatever the incident light source illuminating the tire (for example sunlight or the light of a store), the sidewall deformation is masked by the pattern. The solution proposed is therefore not dependent on the quantity of light reflected off the sidewall of the tire; and
- somebody looking at the tire is practically unable, if able at all, to discern the sidewall deformation.

The invention claimed is:

1. Tire made of elastomeric material, comprising:
   a sidewall; and
   a pattern formed on the sidewall,
   wherein the pattern includes a plurality of protruding elements, the plurality of protruding elements having a form of spherical-cap portions of radius (R), and within the pattern, each of the plurality of protruding elements interpenetrates with several adjacent protruding elements so that a distance (d) between a tip of a respective protruding element and a tip of another adjacent protruding element is less than a diameter (D) of either protruding element;
   wherein the protruding elements meet at connection zones, with the connection zones being curved and having a blend radius (r) such that the blend radius (r)≤radius (R)/3.

2. The tire according to claim 1, wherein a density of protruding elements within the pattern is greater than or equal to 0.2 protruding elements per mm$^2$.

3. The tire according to claim 1, wherein when viewed in a cross section, all or part of the protruding elements subtend an angle (a) less than or equal to 70°, and each subtended angle corresponds to an angle formed by a respective spherical-cap portion of the plurality of protruding elements.

4. The tire according to claim 1, wherein the protruding elements are aligned with one another within the pattern.

5. The tire according to claim 1, wherein in that all or part of the protruding elements have a surface roughness parameter (Ra) less than 30 μm.

6. The tire according to claim 1, further comprising a housing recessed into the sidewall, wherein the pattern is arranged in the housing.

\* \* \* \* \*